(12) United States Patent
Raja

(10) Patent No.: US 11,813,211 B2
(45) Date of Patent: Nov. 14, 2023

(54) SMALL ELECTRIC VEHICLE

(71) Applicant: SUZUKI MOTOR CORPORATION, Hamamatsu (JP)

(72) Inventor: Gopinath Raja, Hamamatsu (JP)

(73) Assignee: SUZUKI MOTOR CORPORATION, Shizuoka (JP)

( * ) Notice: Subject to any disclaimer, the term of this patent is extended or adjusted under 35 U.S.C. 154(b) by 30 days.

(21) Appl. No.: 17/580,211

(22) Filed: Jan. 20, 2022

(65) Prior Publication Data
US 2022/0233376 A1 Jul. 28, 2022

(30) Foreign Application Priority Data
Jan. 28, 2021 (JP) .................................. 2021-012216

(51) Int. Cl.
*A61G 5/04* (2013.01)
*A61G 5/10* (2006.01)
*A61G 5/08* (2006.01)

(52) U.S. Cl.
CPC ............. *A61G 5/1032* (2013.01); *A61G 5/04* (2013.01); *A61G 5/0825* (2016.11); *A61G 2203/14* (2013.01)

(58) Field of Classification Search
CPC ...... A61G 5/1032; A61G 5/0825; A61G 5/04; A61G 2203/14
USPC ........................................................ 180/65.1
See application file for complete search history.

(56) References Cited

U.S. PATENT DOCUMENTS

| 5,253,724 A * | 10/1993 | Prior ...................... B62D 11/04 180/65.6 |
| 10,599,157 B2 * | 3/2020 | Oshima .................... A61G 5/04 |
| 2003/0055538 A1 * | 3/2003 | Yanaka .................. B60L 15/10 701/1 |
| 2018/0164829 A1 * | 6/2018 | Oshima ................ G05D 1/0248 |

FOREIGN PATENT DOCUMENTS

| DE | 10242653 A1 | 5/2003 |
| JP | 2014064620 A | 4/2014 |

OTHER PUBLICATIONS

Extended European Search Report issued in International Application No. 21213593.3 dated Jun. 7, 2022.

* cited by examiner

*Primary Examiner* — Brian L Swenson
*Assistant Examiner* — Hilary L Johns
(74) *Attorney, Agent, or Firm* — TROUTMAN PEPPER HAMILTON SANDERS LLP

(57) ABSTRACT

A small electric vehicle includes: a vehicle body that has a forward and backward direction, and a width direction; left and right driving wheels provided apart in the width direction of the vehicle body; left and right motors connected so as to respectively transmit power to the left and right driving wheels; an operation unit that includes a joystick-type operation piece; and a control unit for controlling the left and right motors according to an amount of operation on the operation piece, wherein the control unit is configured to execute deceleration and stop control when the operation piece is returned to the neutral position during travel, and execute rapid stop control irrespective of an amount of operation in left and right directions when the operation piece is tilted backward during forward travel at a speed equal to or greater than a predetermined threshold.

3 Claims, 4 Drawing Sheets

SMALL ELECTRIC VEHICLE

CROSS REFERENCE TO RELATED APPLICATION

The present application claims priority of Japanese Patent Application No. 2021-012216 filed Jan. 28, 2021. The entire contents of which are hereby incorporated by reference.

TECHNICAL FIELD

The present invention relates to a small electric vehicle.

BACKGROUND

Small electric vehicles including cart-type electric rollators and electric wheelchairs for users having difficulty in walking, such as the elderly, have been publicly known. For example, JP 2014-064620 discloses a small electric vehicle (electric wheelchair) configured such that when an operation piece of joystick-type operation means is tilted straight backward, the vehicle is stopped, and when the piece is tilted left or right backward, the vehicle turns at a fixed position.

SUMMARY

The electric vehicle in Patent Document 1 is normally prohibited from moving backward. To move backward, it is required to operate a separate switch to switch to backward travel, and in this case, forward travel is prohibited. Accordingly, there is a problem in operability in a case in which the stop position is to be adjusted by repeating forward travel and backward travel. Furthermore, no function is provided to rapidly stop in case of urgency, thereby causing a problem in safety.

The present invention has been made in view of the above points in the conventional art, and has an object to provide a small electric vehicle that can perform operations including forward travel, backward travel, turning, stopping, and rapid stopping, only with a joystick-type operation piece, without using a separately provided switch.

To solve the above problems, a small electric vehicle according to the present invention includes:
  a vehicle body that has a forward and backward direction, and a width direction;
  left and right driving wheels provided apart in the width direction of the vehicle body;
  left and right motors connected so as to respectively transmit power to the left and right driving wheels;
  an operation unit that includes a joystick-type operation piece; and
  a control unit for controlling the left and right motors according to an amount of operation on the operation piece,
  wherein the control unit is configured to execute deceleration and stop control when the operation piece is returned to the neutral position during travel, and execute rapid stop control irrespective of an amount of operation in left and right directions when the operation piece is tilted backward during forward travel at a speed equal to or greater than a predetermined threshold.

As described above, the small electric vehicle according to the present invention is configured to execute deceleration and stop control when the operation piece is returned to the neutral position during travel, and to execute rapid stop control irrespective of the amount of operation in left and right directions when the operation piece is tilted backward during forward travel at a speed equal to or greater than a predetermined threshold. Accordingly, the vehicle can perform operations including forward travel, backward travel, turning, stopping, and rapid stopping, depending on the situation, only with a joystick-type operation piece, without using a switch or a brake lever. It is advantageous to improve operational simplicity, usability and safety, simplify the structure, and reduce the number of components.

DETAILED DESCRIPTION

Hereinafter, embodiments of the present invention are described in detail with reference to the drawings.

Figure 1:
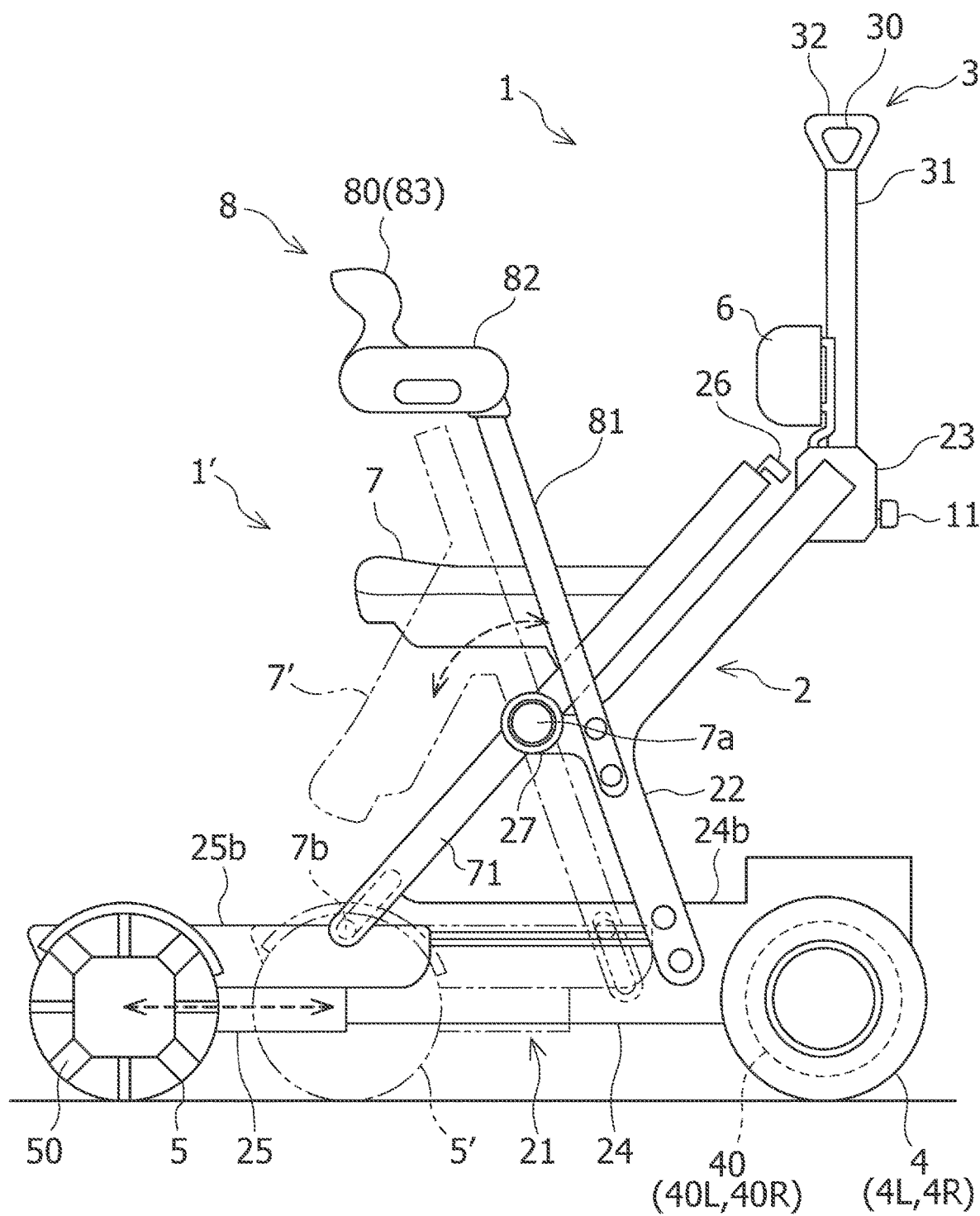
FIG. 1 is a side view showing a small electric vehicle.

In FIG. 1, an electric vehicle 1 according to an embodiment of the present invention includes a vehicle body 2 made up of a mobile base 21 (lower traveling body), and an upper frame 22 provided to stand from a rear part (rear-side base 24) of the mobile base 21, and is usable in a small electric vehicle mode (riding mode 1) indicated by solid lines in the diagram, and in a walking assisting vehicle mode (1') indicated by chain double-dashed lines in the diagram.

The mobile base 21 includes: the rear-side base 24 (main body part) provided with left and right driving wheels 4 (rear wheels), and the upper frames 22; and a front-side base 25 provided with left and right driven wheels 5 (front wheels). The front-side base 25 is joined to the front side of the rear-side base 24 slidably in the front and rear direction. The mobile base 21 is configured such that the wheelbase is expandable and contractible.

The left and right driving wheels 4 are independently driven respectively by left and right motor units 40 (40L and 40R) mounted on the rear-side base 24. The left and right driven wheels 5 is made up of free wheels (omni wheels, or omnidirectional wheels) including many rotatable rollers 50 at grounding parts around axes in circumferential directions. As described later, the electric vehicle 1 can be steered, and braked and driven only by controlling the left and right motor units 40L and 40R.

The upper frames 22 have an inverted U form or a gate shape formed by joining upper ends of a pair of left and right side frames provided to stand upward from both the left and right sides of the rear-side base 24, with an upper end frame extending in the vehicle width direction. A lower end part of a stem 31 of a rear handle 3 is rigidly coupled to a coupling part 23 at the center of the upper end frame in the vehicle width direction, and a seat backrest 6 is supported at the coupling part 23.

The rear handle 3 is formed in a T bar shape that has a pair of grip parts extending left and right from a connection portion 32 with the upper end of the stem 31. At the left and right grip parts of the rear handle 3, grip sensors 30 that detect a state of gripping (hands on) by a user (or a helper) are provided. Touch sensors, such as capacitance sensors or pressure-sensitive sensors, can be used as the grip sensors 30. The left and right grip parts of the rear handle 3 serve as an operation unit in the case of use by the user alone in the walking assisting vehicle mode (1'), and in the case in which the helper or the like operates the electric vehicle in a case in which the user is seated on the seat 7. Note that although omitted in FIG. 1, an electromagnetic brake release switch 34, and a speaker 35 are provided on the connection portion 32 at the center of the rear handle 3.

Base parts of support frames 81 for armrests 82 are fixed at bent parts at the middle of the upper frames 22 (side frames) in the height direction. A joystick 83, which constitutes a riding mode operation unit 8, is provided at a front end part of the armrest 82 on the right side, which is a deeper side in the FIG. 1. A display unit 80 and a travel permission switch 84 are provided on an upper surface of the grip part having the same shape at a front end part of the armrest 82 on the left side, which is a near side in FIG. 1.

A two-axis joystick that can be tilted to the front, rear, left and right, or a multi-axis joystick including the function thereof can be adopted as the joystick 83, which is configured such that an urging force (a restoring force or an operational reaction force) toward a neutral position depending on the tilted angle is applied, by an urging member (spring etc.), not shown. In a state in which no operational force is applied, that is, a state in which the hand of the user is off the joystick 83, the joystick returns by itself to the neutral position.

At a pivot support part 27 that protrudes forward from the bent parts of the upper frames 22 (side frames), support frames 71 for the seat 7 (seat cushion) are pivotably supported by a shaft 7a in the vehicle width direction. In addition, the lower ends of the support frames 71 are rotatably and slidably joined to the front-side base 25 (pins) via the joining parts 7b (slots).

According to the configuration described above, when the seat 7 at a seating position is turned downward ahead from the riding mode (1) indicated by the solid lines in the diagram to a folded position (7') as indicated by chain double-dashed lines in the diagram, the front-side base 25 is slid backward in an interlocking manner, the mobile base 21 is shortened, and the mode becomes a walking assisting vehicle mode (1'), which allows user operation while standing and walking with the rear handle 3 being gripped.

Conversely, when the seat (7') at the folded position is moved from the walking assisting vehicle mode (1') to the seating position 7 by turning upward behind, the front-side base 25 slides forward, the mobile base 21 is elongated, and the mode becomes the riding mode (1). In this state, an upper surface 25b of the front-side base 25 moved ahead of a tray 24b can be used as a footrest for a passenger.

Note that locking mechanisms (locking pins or the like urged by urging members, such as springs) that lock the front-side base 25 at each of an elongated position and a shortened position are provided in the mobile base 21, in which a vehicle state detection sensor 28 (mechanical switch etc.) that detects the locked state in each position is attached. Furthermore, urging members (springs, etc.) for urging toward the intermediate position (in a release direction) at each of the elongated position and the shortened position are provided. Release tags 26 joined to the locking mechanisms through Bowden cables are provided at upper end portions of the support frames 71.

Accordingly, the configuration is made such that when the release tags 26 are pulled at any of the elongated position and the shortened position and the locking mechanisms are released, the vehicle body 2 is at the intermediate position by being urged by the urging members, and when, from this state, the seat 7 (support frames 71) is turned forward or backward from the intermediate position against urging by the urging members, the locking mechanisms are locked at any of the elongated position and the shortened position of the front-side base 25.

Figure 2:
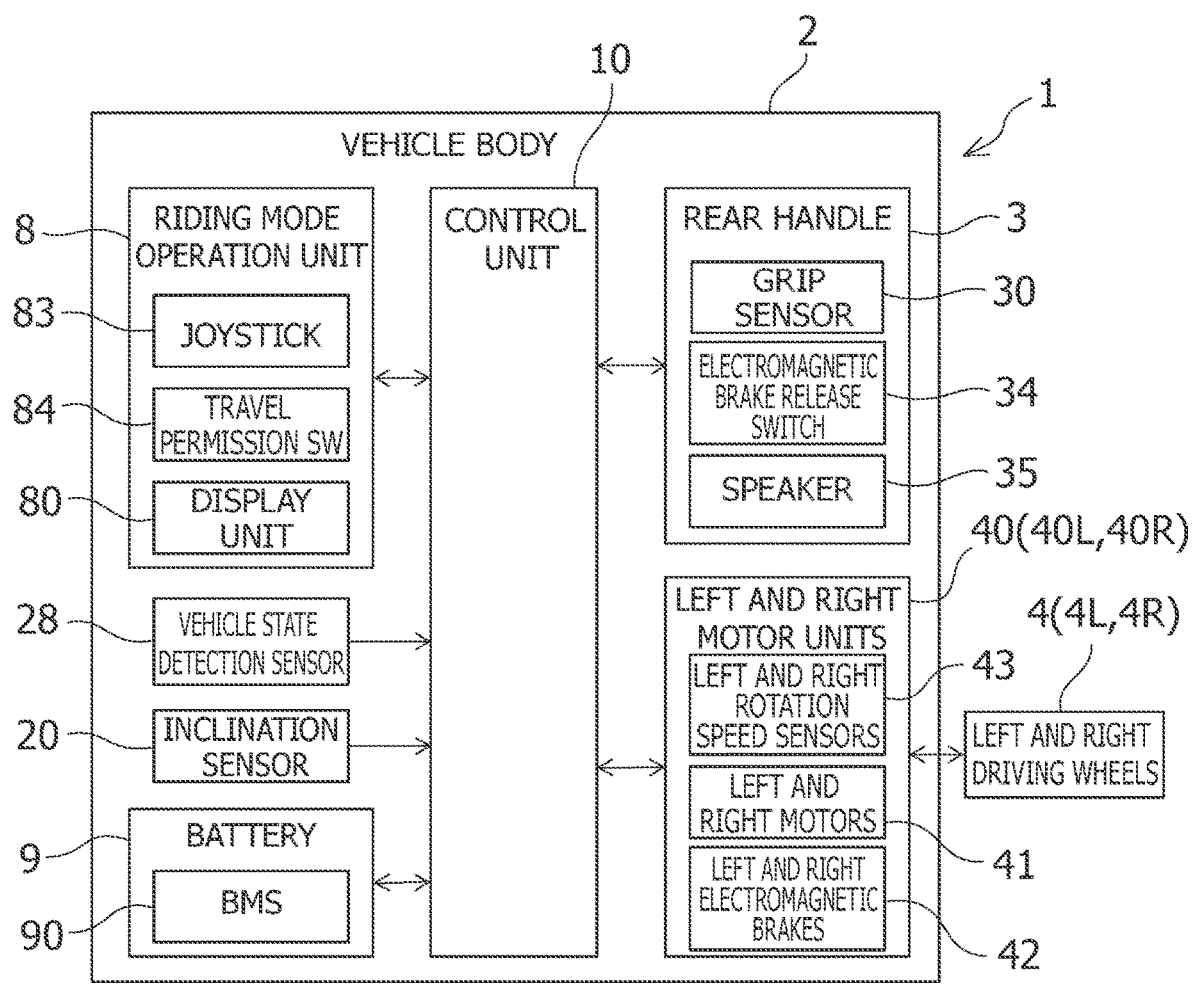
FIG. 2 is a block diagram showing a control system of the small electric vehicle.

FIG. 2 is a block diagram showing a control system of the electric vehicle 1. The electric vehicle 1 includes a battery 9 that supplies power to the left and right motor units 40 (40L and 40R), and a control unit 10 that controls the left and right motor units 40 (40L and 40R). The control unit 10 has an interlock function of executing control for each of the riding mode (1) and the walking assisting vehicle mode (1') in the locked state at the corresponding position detected by the vehicle state detection sensor 28.

In the riding mode (1), the grip sensors 30 are disabled, the control unit 10 performs speed control (and rapid stop control, described later) for the left and right motor units 40 (40L and 40R) on the basis of a predetermined control map and an operation (the amount of operation, and operation direction) on the joystick 83, which constitutes the riding mode operation unit 8, when the travel permission switch 84 is turned on. Note that when an inclination equal to or greater than a predetermined threshold is detected by an inclination sensor 20, the target speed is corrected in consideration of the gravity (load) applied depending on the inclination.

On the other hand, in the walking assisting vehicle mode (1'), the riding mode operation unit 8 is disabled, the control unit 10 controls the torques of the left and right motor units 40 (40L and 40R) on the basis of detection information from the inclination sensor 20, the left and right rotation speed sensors 43 and the like and of a predetermined control map. Note that when an inclination equal to or greater than a predetermined threshold is detected by the inclination sensor 20, a compensation torque for compensating for the gravity (load), which is applied depending on the inclination, is superimposed on the torque command value. The grip sensor 30 only detects a grip (hands on/off) on the rear handle 3 by the user, and is not involved in the torque control on the motor units 40.

The control unit 10 includes: a computer (microcomputer) made up of a ROM that stores a program and data for executing control in each of the modes, a RAM that temporarily stores a computation processing result, a CPU that performs computation processes and the like; and a power source circuit that includes drive circuits (motor drivers) for the left and right motors 41, and a relay that turns on and off the power of the battery 9.

The left and right motor units 40 (40L and 40R) each include a motor 41, an electromagnetic brake 42 that locks the rotor of the corresponding motor 41, and a rotational position sensor (43) that detects the rotational position of the corresponding motor 41. Drive shafts of the motors 41 are connected to the respective driving wheels 4 (4L and 4R) via reduction gears, not shown, in a power-transmissible manner.

The left and right motors 41 are made up of brushless DC motors that switch the currents in coils in corresponding phases in the drive circuits to support the phases of rotors detected by the rotational position sensors (43). In the riding mode (1), the rotational position sensors (Hall sensors) are used as vehicle speed sensors (43) that detect the speed of the electric vehicle 1. In the walking assisting vehicle mode (1'), the rotational position sensors are used as the rotation speed sensors 43.

The drive circuits for the left and right motors 41 include current sensors that detect coil currents. The coil currents correspond to the torques of the left and right motors 41. The control unit 10 executes the torque control of the left and right motors 41 by controlling the coil currents.

Preferably, the electromagnetic brakes 42 are negative actuation electromagnetic brakes that lock the drive shafts of the motors 41 in an unexcited state, and release the locking in an excited state. By adopting the negative actuation electromagnetic brakes, the electric vehicle 1 can be securely stopped when the key is turned off or at a stop without consuming power.

On the other hand, to cause the locks of the electromagnetic brakes 42 to be released and allow the electric vehicle 1 to be movable in case of urgency or an emergency, for example, in a case in which it is intended to move the electric vehicle 1 without using the power of the motors 41, or in an undrivable case due to reduction in remaining battery charge, the electromagnetic brake release switch 34 is provided as forcible release means for the electromagnetic brakes 42. The electromagnetic brake release switch 34 is provided adjacent to the grip part of the rear handle 3, but is operable irrespective of detection of gripping of the grip sensor 30.

A momentary operation release switch (e.g., a push button switch) is suitable for the electromagnetic brake release switch 34 such that in a state in which the user is in operation, the contact is closed and the locking of the electromagnetic brakes 42 is released, and when the user releases the touch on the electromagnetic brake release switch 34, the contact is opened and the electromagnetic brakes 42 are locked.

Accordingly, if the electromagnetic brakes 42 are released to allow the electric vehicle 1 to travel and then the user's hand lets go of the electromagnetic brake release switch 34, the electromagnetic brakes 42 are immediately locked, which prevents the electric vehicle 1 from running idle. Note that when the electromagnetic brakes 42 are released on an inclined ground, the vehicle may possibly run idle by its own weight until the user's hand is off the electromagnetic brake release switch 34. Accordingly, a condition of releasing the electromagnetic brakes 42 is set depending on the inclination of the vehicle body 2 detected by the inclination sensor 20.

The control unit 10 disables the operation on the electromagnetic brake release switch 34 during driving of the motors 41. Only when the motors 41 are stopped and each of the rotation speeds detected by the rotation speed sensors 43 is less than a predetermined threshold value, that is, when the vehicle speed can be substantially assumed to be zero, does the unit enable the operation on the electromagnetic brake release switch 34.

The inclination sensor 20 is implemented on a circuit board of the control unit 10 mounted in the mobile base 21 (rear-side base 24) of the vehicle body 2. A two-axis inclination sensor or an acceleration sensor that detects the inclinations in the front and rear direction and the lateral direction of the vehicle body 2, or a multi-axis inertial sensor in which the acceleration sensor and an angular acceleration sensor (gyroscope sensor) are integrated is usable.

According to the electric vehicle 1 configured as described above, in the riding mode (1), based on the operation (the amount of operation, and operation direction) on the joystick 83 by the user, the rotation speeds of the left and right motor units 40 (40L and 40R) are controlled, and normal control including forward travel, backward travel, turning, and deceleration and stop, and rapid stop control are executed.

(Normal Control in Riding Mode)

Figure 3A:
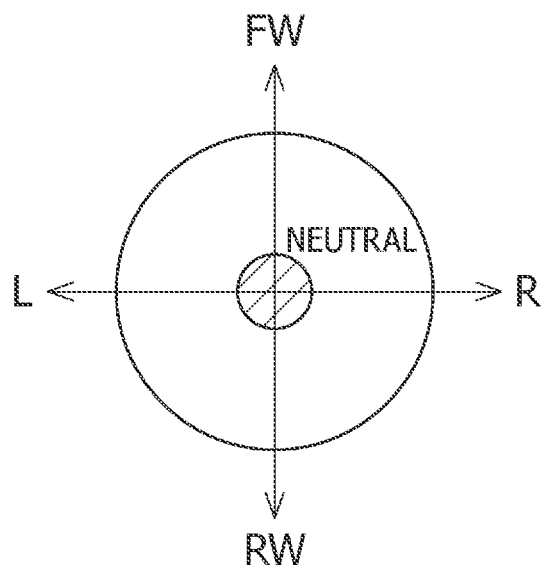
FIG. 3A, 3B show joystick control maps for normal control, and for rapid stop control.

That is, in FIG. 3A, when the joystick 83 is tilted forward FW from the neutral position, the rotation speeds of the left and right motor units 40 (40L and 40R) are controlled so as to achieve the target speed (target vehicle speed) in the forward traveling direction in response to the amount of operation (tilted angle) on the joystick 83, and the electric vehicle 1 travels forward.

In this case, when the operation on the joystick 83 includes any of the left and right direction components (L and R), different target speeds are set in the left and right motor units 40 (40L and 40R), and the electric vehicle 1 travels forward and turns in the operation direction (L/R) of the joystick 83.

On the other hand, when the joystick 83 is tilted backward RW from the neutral position, the target speed in the backward traveling direction is set in response to the amount of operation (tilted angle) of the joystick 83, and the electric vehicle 1 travels backward. Also in backward travel, when the operation of the joystick 83 includes any of the left and right direction components (L and R), different target speeds are set in the left and right motor units 40 (40L and 40R), and the electric vehicle 1 travels backward and turns in the operation direction (L/R) of the joystick 83. Note that the target speed and the maximum target speed in the backward traveling direction RW is set to have a smaller value than that in the forward traveling direction FW.

In a state in which the joystick 83 is operated in any of the forward, backward, and left and right directions, and the vehicle is traveling forward or backward, or turning as described above, returning the joystick 83 to the neutral position or returning the joystick 83 by itself to the neutral position decelerates and stops the electric vehicle 1 according to a predetermined deceleration.

(Rapid Stop Control in Riding Mode)

Figure 3B:
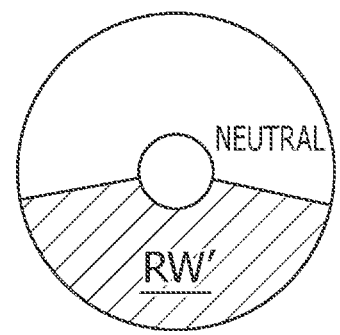

In a state in which the joystick 83 is operated forward FW and the vehicle is traveling forward or turning forward with a vehicle speed equal to or greater than the predetermined threshold, a reverse operation backward RW' on the joystick 83 from the neutral position as shown in FIG. 3B executes rapid stop control irrespective of the left and right direction components.

That is, the target deceleration greater than that in the deceleration and stop case is set to the left and right motor units 40 (40L and 40R). Regenerative braking by the left and right motor units 40 is executed. In a state in which the electric vehicle 1 has a predetermined low speed or lower, the left and right motor units 40 are locked by the respective electromagnetic brakes 42, and the electric vehicle 1 is completely stopped.

When the joystick 83 is operated forward FW or to the neutral position during the above rapid stop control (or when being returned by itself), or when a predetermined time period (e.g., four seconds) elapses after the vehicle is stopped by the rapid stop control, the rapid stop control is finished, and the control transitions to normal control in response to the operation position of the joystick 83 at the time.

That is, if the joystick 83 is tilted forward FW when the rapid stop control is finished, the electromagnetic brakes 42 are released to start forward travel or forward turning. If the joystick 83 is tilted backward RW, the electromagnetic brakes 42 are released, and backward travel or backward turning is started. If the joystick 83 is at the neutral position, only releasing of the electromagnetic brakes 42 is performed. Note that in this case, when an inclination equal to or greater than the predetermined threshold is detected by the inclination sensor 20, a compensation torque in the direction of compensating the gravity (load) applied depending on the inclination may be superimposed on the holding torque in the stop state.

Figure 4:
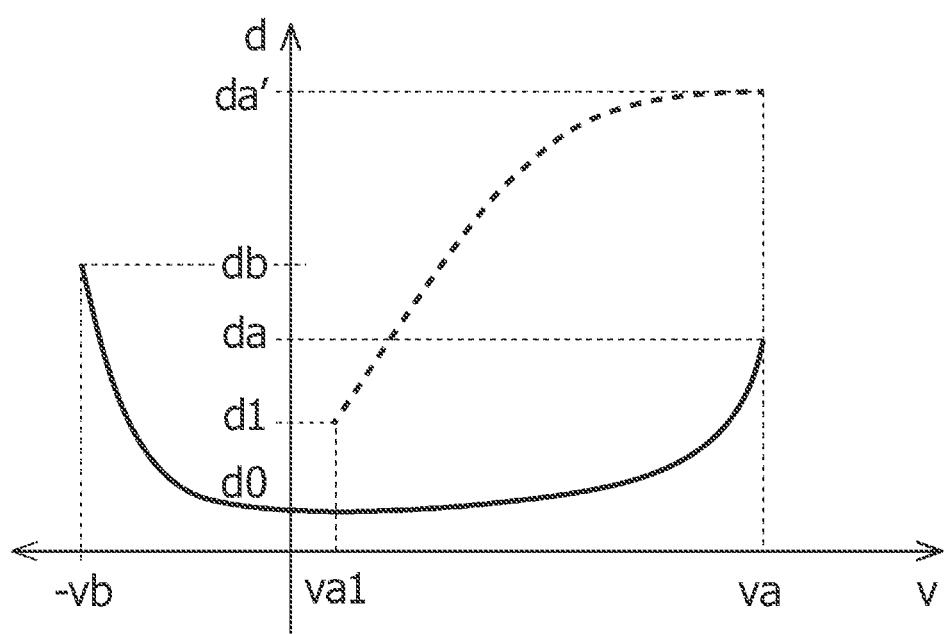
FIG. 4 is a deceleration map showing target deceleration for the normal control and the rapid stop control.
Figure 5:
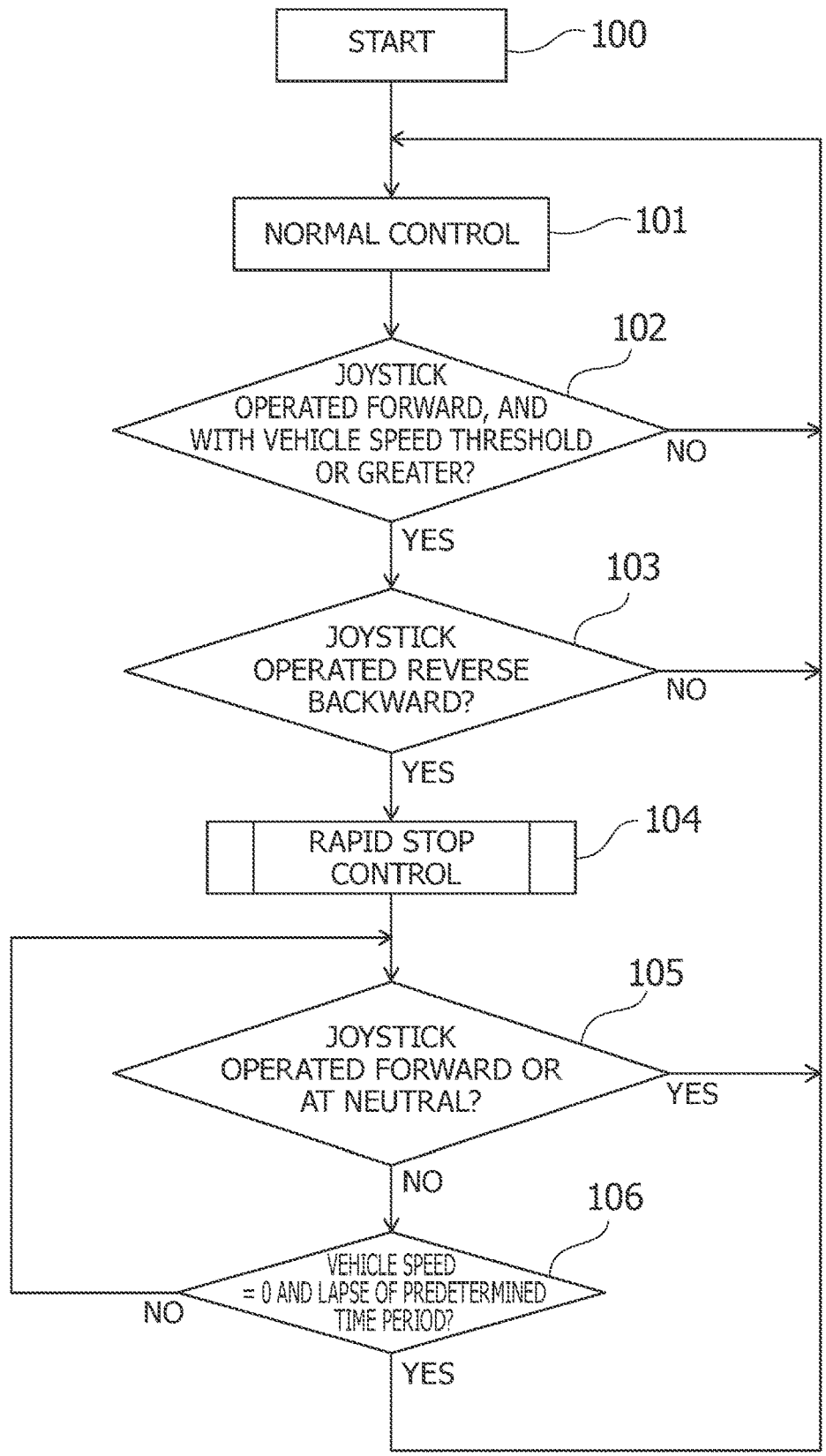
FIG. 5 is a flowchart showing the normal control and the rapid stop control for the small electric vehicle.

FIG. 4 shows a setting example (deceleration map) of the target deceleration during deceleration and stop in normal control, and during rapid stop control. In FIG. 4, during deceleration and stop in normal control, the target deceleration is set such that depending on the vehicle speed v at the start of deceleration control, the speed gradually decreases from the target deceleration da at the maximum forward speed va, or the target deceleration db at the maximum backward speed −vb, to the target deceleration speed d0. According to such setting, smooth and secure deceleration and stop can be performed.

Note that with respect to the maximum forward speed va (e.g., 4.5 km/h), the maximum backward speed −vb (e.g., −1 km/h) is set to be smaller. Accordingly, the target deceleration db (e.g., 7 km/h/s) during backward travel is set to have a greater value than the target deceleration da (e.g., 5 km/h/s) during forward travel, but may be equivalent to that during forward travel.

On the other hand, during rapid stop control, depending on the vehicle speed v at the start of rapid stop control, the target deceleration is set from the target decelerations da' (e.g., 15 km/h/s) sufficiently greater than that during normal control, to the target deceleration dl (e.g., 5 km/h/s) with the vehicle speed threshold val during rapid stop control, in order to securely achieve braking and stopping in a short time as much as possible.

Note that the target decelerations during deceleration and stopping in normal control and during rapid stop control may have fixed values corresponding to the respective cases. In such cases, the intermediate target deceleration may be, for example, target deceleration 4 km/h/s during deceleration and stopping in normal control, and target deceleration 8 km/h/s during rapid stop control.

(Basic Control Flow in Riding Mode)

When the power is turned on by an operation on a key 11 and the system is activated, the electric vehicle 1 configured as described above is set to the riding mode (1) or the walking assisting vehicle mode (1') depending on the frame style at the activation. Note that as already described above, in the stop state of the electric vehicle 1, the electromagnetic brakes 42 are in a locked state.

Hereinafter, control in a case of the riding mode (1) at the activation, or a case in which the riding mode (1) is set by an operation by the user in the stop state after activation is described with reference to a flowchart in FIG. 4.

First, in the state of the riding mode (1) being set (step 100), the user is seated on the seat 7 and turns on the travel permission switch 84, normal control is executed, and the joystick 83 is in a standby state at the neutral position, and when the joystick 83 is operated to the front, rear, left or right, forward travel, backward travel, or left or right turning can be achieved (step 101).

During such normal control, in a state in which the joystick 83 is operated forward and the vehicle is traveling forward or turning forward with a vehicle speed equal to or greater than the predetermined threshold (e.g., 0.5 km/h) (step 102), the joystick 83 is reversely operated backward (step 103); in this case, rapid stop control is executed irrespective of the left and right direction components (step 104).

When the joystick 83 is operated forward or to the neutral position (or returns by itself) during rapid stop control (step 105), the rapid stop control is terminated, and the control transitions to normal control (step 101) in response to the operation position (forward or the neutral position) of the joystick 83.

On the other hand, when, while the joystick 83 is maintained in the backward reverse operation state, the electric vehicle 1 is rapidly stopped and the vehicle speed of the electric vehicle 1 becomes 0 km/h (at a time when the electromagnetic brakes 42 are locked), measurement of the predetermined time period is started and the predetermined time period (e.g., four seconds) elapses; in this case, the control transitions to the normal control (step 101).

As described above in detail, the electric vehicle 1 according to the present invention is configured to execute relatively gradual deceleration and stop control when the joystick 83 is returned to the neutral position during travel, and execute rapid stop control irrespective of the amount of operation in the left and right directions when the joystick 83 is reversely operated backward during forward travel at a speed equal to or greater than the predetermined threshold. Accordingly, operations including forward travel, backward travel, turning, stopping, and in addition thereto, rapid stopping can be executed depending on the travel state of the electric vehicle 1, only with the operation on the joystick 83, without using a separately provided switch or the brake lever.

In particular, rapid stopping through the reverse backward operation on the joystick 83 conforms to an operation naturally performed by a person in situations with an intention of emergency stop of the electric vehicle 1, and is advantageous to improvement in operational simplicity, usability, and safety. The switch, the brake lever, and the rapid stop button are not required to be mounted. Accordingly, it is advantageous to simplify the structure and reduce the number of components.

In the rapid stop control, the speed is reduced by regenerative braking by the left and right motor units 40 to a predetermined low speed, and then the electromagnetic brakes 42 are locked. Accordingly, the shock due to locking of the electromagnetic brakes 42 is small, and the vehicle can be securely stopped.

Furthermore, when the joystick 83 is operated forward or to the neutral position during the rapid stop control, or when a predetermined time period elapses after the vehicle is stopped by the rapid stop control, the rapid stop control is finished, and the control transitions to normal control in response to the operation position of the joystick 83. Accordingly, when the need for a rapid stop is negated, the control can be easily returned to the normal control.

The embodiments of the present invention have been described above. However, the present invention is not limited to the embodiments. Based on the technical thought of the present invention, various modifications and changes can further be made.

For example, in the embodiments described above, the case in which the electric vehicle 1 has the walking assisting vehicle mode has been described. However, the present invention can be implemented as a small electric vehicle and an electric wheelchair that have no walking assisting vehicle mode.

In the embodiments described above, the case of including the omni wheels as driven wheels 5 has been described. Alternatively, caster type free wheels may be included.

The invention claimed is:

1. A small electric vehicle comprising:
   a vehicle body comprising a forward and backward direction, and a width direction;

left and right driving wheels provided apart in the width direction of the vehicle body;

left and right motors connected so as to respectively transmit power to the left and right driving wheels;

an operation unit comprising an operation piece with a joystick-type; and a control unit controlling the left and right motors according to an amount of operation on the operation piece, wherein the control unit is configured to execute deceleration and stop control that decelerates with a first target deceleration to stop when the operation piece is returned to the neutral position during travel, and execute rapid stop control that decelerates with a second target deceleration greater than the first target deceleration to stop irrespective of an amount of operation in left and right directions when the operation piece is tilted backward during forward travel at a speed equal to or greater than a predetermined threshold.

2. The small electric vehicle according to claim 1, wherein the rapid stop control includes regenerative braking through the left and right motors, and locking of the left and right driving wheels or the left and right motors by electromagnetic brakes at a predetermined low speed.

3. The small electric vehicle according to claim 1, wherein the control unit is configured to finish the rapid stop control and execute normal control depending on an operation position of the operation piece, when the operation piece is operated forward or to the neutral position during the rapid stop control, or when a predetermined time period elapses after the vehicle is stopped by the rapid stop control.

* * * * *